Sept. 26, 1933.  C. E. FLATTER  1,928,373
LATHE ATTACHMENT FOR PROFILING FORMS FOR MOLDS
Filed May 23, 1932  3 Sheets-Sheet 2

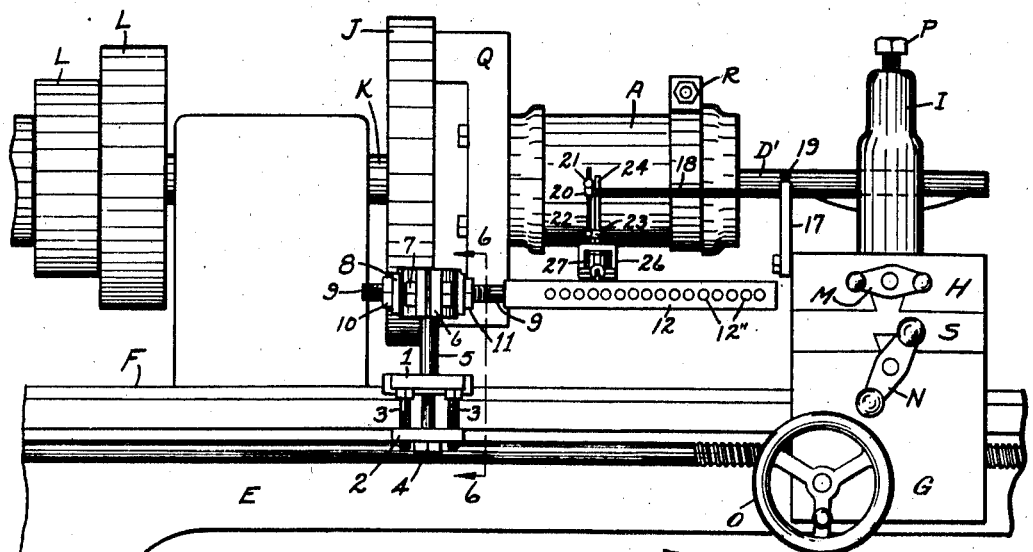
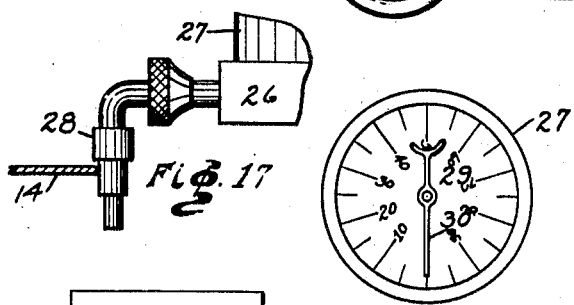
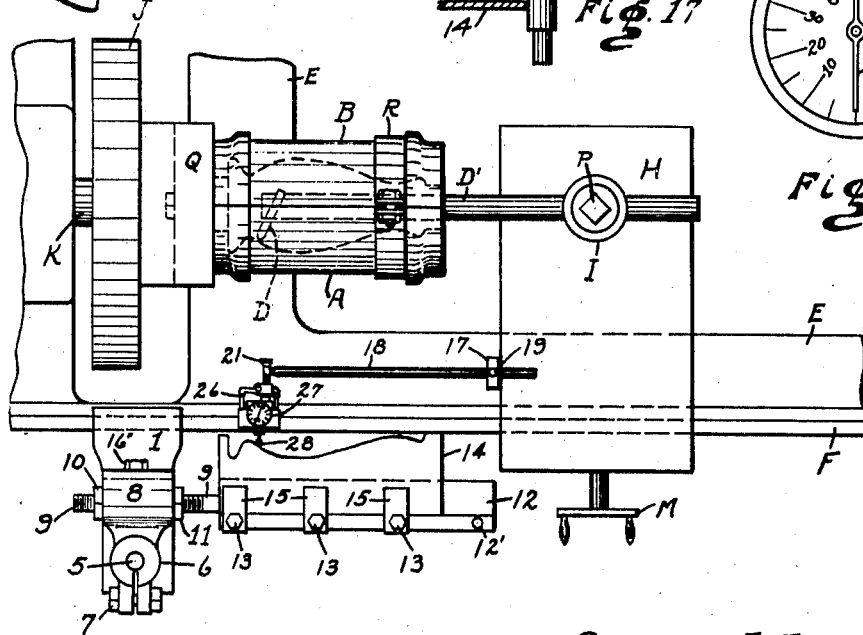

Inventor;
CARLISS E. FLATTER
By
Attorney.

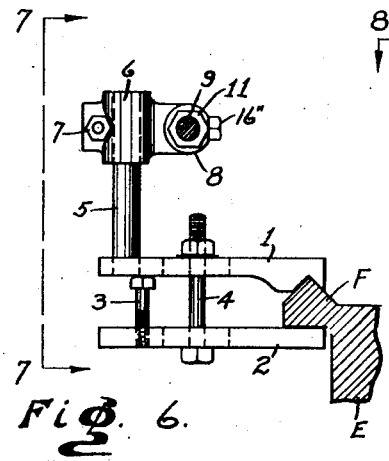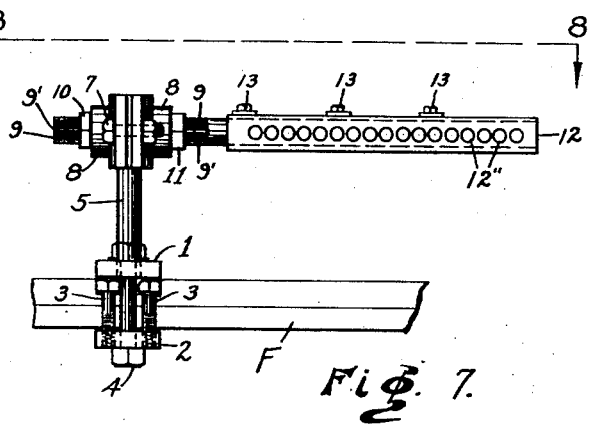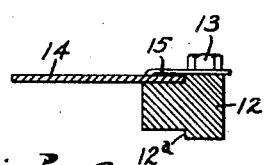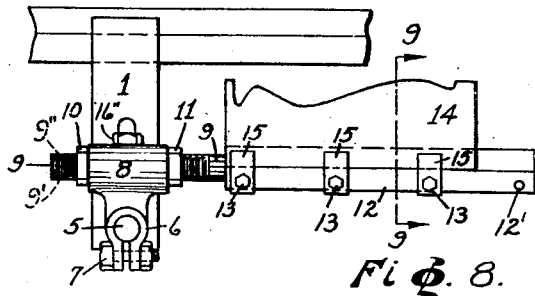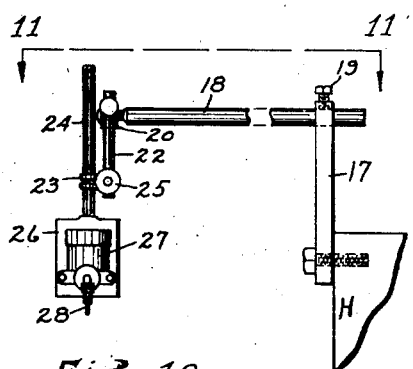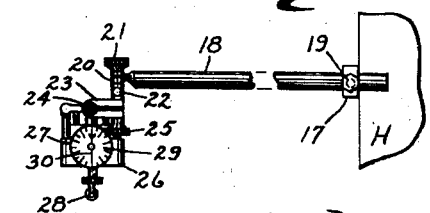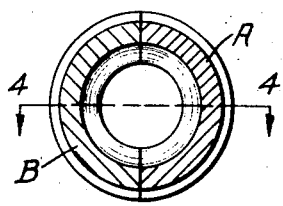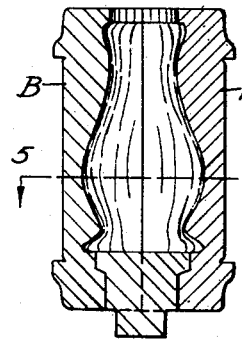

Patented Sept. 26, 1933

1,928,373

UNITED STATES PATENT OFFICE 1,928,373

LATHE ATTACHMENT FOR PROFILING FORMS FOR MOLDS

Carliss E. Flatter, Winchester, Ind., assignor, by direct and mesne assignments, of one-third to Edward Lenkensdofer and one-third to George H. Ward, both of Winchester, Ind.

Application May 23, 1932. Serial No. 612,959

7 Claims. (Cl. 82—14)

The object of my invention, broadly stated, is the provision of an attachment for lathes, to be employed when forming a matrix of irregular contour inside a casting; or when forming an outside contour for a similar purpose, the actual cutting being performed by means of a cutting tool or bit, manually controlled by means of the operation of the lathe and especially providing means for enabling the operator to accurately control the operations of the cutting tool.

More particularly stated, the object of my invention is the provision of an attachment for lathes, whereby a matrix to have an irregular contour inside a casting, the matrix can be accurately formed even though the operator can not see the actual results of the cutting bit at the time the matrix is being formed.

Another related object, is the provision of a guide for an outside contour, as it is being formed, whereby even though the operator can see the results of the cutting bit, as the form is being made, he will be able to form the contour more accurately, in fact it may be formed exactly to a predetermined pattern.

Other objects and particular advantages of my invention will suggest themselves in the course of the following description, and that which is new will be correlated in the appended claims.

One manner of carrying out the principles of my invention, in a practical and economical way, is shown in the accompanying three sheets of drawings, in which—Figure 1 shows a portion of a lathe in front elevation, showing my invention in operative assembly in connection therewith, and showing a casting in which a matrix is formed. Figure 2 is a top plan view of the same, showing, in dotted lines, the outline of the matrix formed, or being formed, therein.

Figure 3:
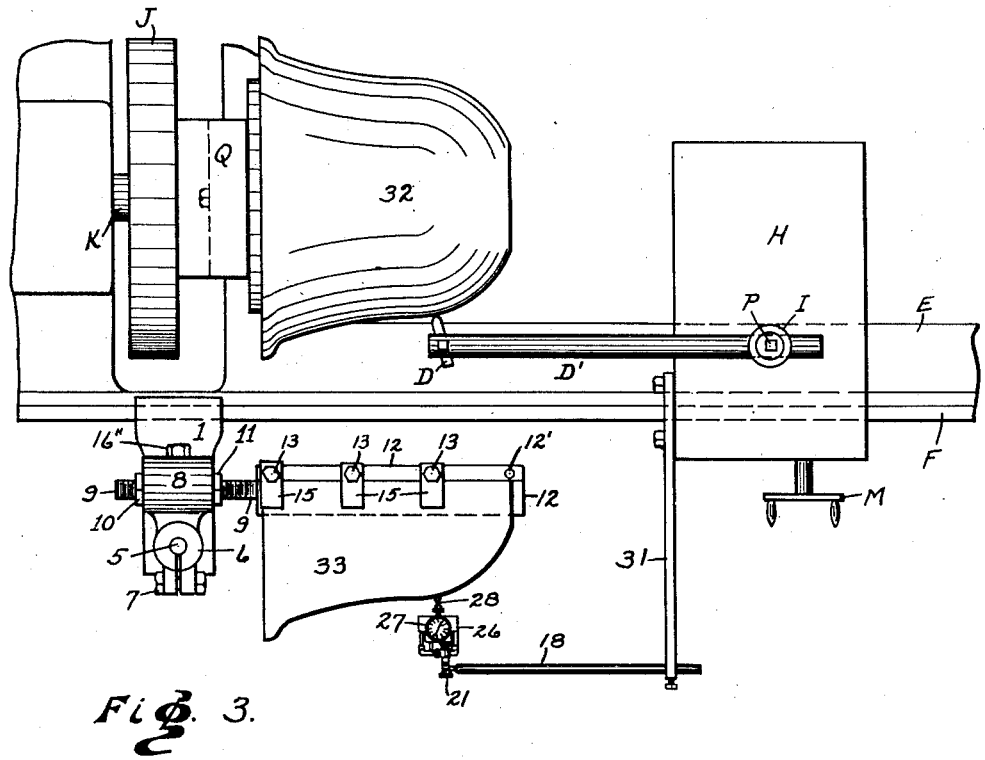
Figure 12:
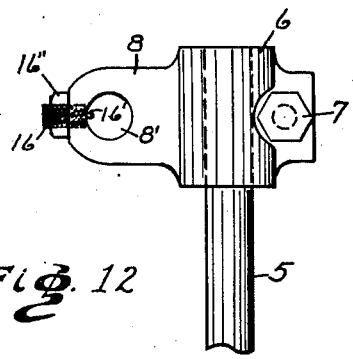
Figure 15:
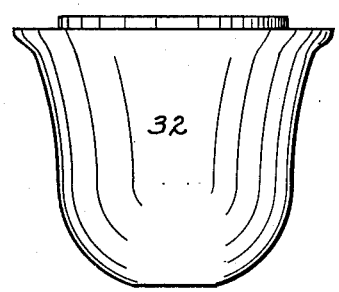
Figure 13:
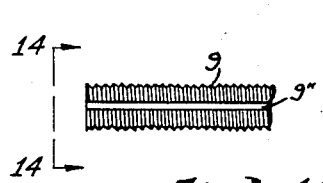
Figure 14:
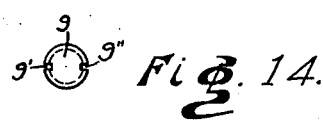

Figure 3 is a top plan, showing a portion of the lathe, with my invention applied for the formation of an outside or peripherial form for casting. Figure 4 is a vertical section of a mold, with the completed matrix formed therein, as taken on the line 4—4 of Fig. 5. Figure 5 is a cross section of the mold, as taken on the line 5—5 of Fig. 4. Figure 6 is a side elevation showing the supporting portion of my device and showing the manner of clamping the same to the track-way of a lathe. Figure 7 is a front elevation of portions of my device, showing the same clamped to the track-way of a lathe, as taken at right-angles to Fig. 6, and as taken from the line 7—7 thereof. Figure 8 is a plan view of a portion of my device showing a templet for inside work in operative position in connection, and as taken from the line 8—8 of Fig. 7. Figure 9 is a detail cross section of a templet, showing the same in secured position, and as taken on the line 9—9 of Fig. 8. Figure 10 shows an elevation of the indicator and its supporting and adjusting means. Figure 11 is a top plan view of the indicator and its supporting parts. Figure 12 is a detail view, showing the means for positively and accurately securing the templet in either the position in which it is shown in Fig. 2 for inside work, or the position shown in Fig. 3 for outside work. Figure 13 is a side view of a channeled stem, the aperture for which is shown in Fig. 12. Figure 14 is an end view of the stem shown in Fig. 13. Figure 15 is an outside elevation of a completed outside mold. Figure 16 is a plan view showing the face of the indicator. And Figure 17 is a side elevation, showing the compression stem in connection with a portion of a templet, shown in cross section.

Similar indices designate like parts throughout the several views.

In order that the construction and the operation of my invention may be more fully understood and appreciated, I will now take up a detailed description thereof, in which I will set forth the same as fully and as comprehensively as I may.

The basis for my invention is, usually, an ordinary power driven lathe, comprising a base-frame E, having a tapered or V-shaped track F on each side thereof, on which the carriage G is slidably mounted, whereby it may travel laterally. Mounted to be moved slidably forwardly and rearwardly on the carriage G is the intermediate head S, and on the head S is mounted the head H, and it is adapted to be adjusted slidably, forwardly and rearwardly. Extending upwardly from the head H is the tool post I, which is adapted to have the stem D', of the bit D, adjustably secured thereto by means of the screw P, with the stem D' extending to the left therefrom to where it is secured to the bit D, which is carried thereby. Letter Q denotes special work holding device, which is secured to the face plate J, the latter being secured to the live spindle K which is rotatable by power connected through a pulley L. Letter M designates the handle for manually moving the head H forwardly and rearwardly. Letter N denotes the handle for manually moving the intermediate head S. And letter O denotes a wheel for manually moving the carriage G laterally.

As the construction and the operation of the lathe is well understood by the ordinary mechanician, therefore it is considered that further explanation thereof would add more to prolixity than to clearness of comprehension.

In the preparation of a casting mold, it is usual that the same be formed by two identical sections, as the sections A and B, as shown herein, said sections being divided centrally and longitudinally into two equal parts. When being cast the two sections of the mold are provided with a starter aperture extending concentrically therethrough, or partly therethrough. Said starter aperture is located half in the contact face of each section.

After the two sections of the mold are secured together, by the clamping band R, as shown in Figs. 1 and 2, they are then securely attached, as a unit, to the face of the work holding device Q, whereby said starter aperture will be concentric with head H.

The bit D is then to be adjusted to operate in said starting aperture as the mold is being rotated.

Especially when it is required that the matrix, to be formed in the mold, is to be of irregular profile, or contour, it is very difficult to accomplish the same with any degree of accuracy, for the reason that the operator is unable to see just where or how the bit is working in the mold, or for him to accurately follow the contour of the templet, therefore the particular purpose of this invention is to fully overcome this difficulty, which I am able to accomplish by the mechanism, which I will now describe in detail: In the drawings numeral 1 denotes the main member of the supporting clamp, by means of which certain parts of my device are secured to the lathe.

Said member 1 has an inverted V-shaped notch formed in the under side of its forward portion, which notch is formed to accurately fit over the bevel of the forward track F, as shown in Fig. 6. Numeral 2 designates the lower, or secondary member of said clamp, and its forward end portion is adapted to engage the under flat side of the track F, as shown in Fig. 6.

Threaded into and extending upwardly from the inner portion of the clamp member 2, are the two adjusting screws 3, with which the inner portion of the member 1 may contact, that the members 1 and 2 may be retained parallel with relation to each other. Numeral 4 designates a clamping bolt, which extends through the central portion of the members 1 and 2, as shown in Fig. 6, whereby the clamp may be rigidly and accurately connected with the track F, and by which it will be properly aligned with relation to the bit D, and with other parts of the lathe.

Rigidly secured in the inner end portion of the member 1, and extending directly upward therefrom, is the main standard 5. Fitting around the standard 5 is the vertical collar 6, which is adapted to be rigidly secured thereto by means of the clamping bolt 7.

Formed integral with, but at right-angles to, the collar 6, is the horizontal, smooth-bore, collar 8, in which is slidably mounted the threaded stem 9. Said stem 9 has, in its periphery, two equally divided channels 9′ and 9″, extending longitudinally thereof, as shown in Figs. 13 and 14. Locking nuts 10 and 11 are threaded on the stem 9, for contacting with the ends of the collar 8, in order to rigidly secure the stem 9 in proper position. Forming a continuation of the stem 9, and extending to the right concentrically therewith, is the templet-bar 12, shown in cross-section in Fig. 9, one side portion of which is wider, or thicker, vertically, than is the other, whereby a shoulder 12a is provided on each side thereof, as indicated in Fig. 9. Said shoulders extend the full length of the bar 12, as indicated.

A plurality of apertures 12 are formed horizontally through the bar 12, for the purpose only of reducing the weight of the bar.

Also a plurality of apertures 12′ are formed vertically through the thickest portion of the member 12, to receive therein the threaded machine bolts 13. Numeral 14 denotes a templet, one edge of which may contact with one of the shoulders 12a, where it may be secured by the clips 15, which in turn are secured by the bolts 13.

For inside contouring, the templet should project directly inward, as in Figs. 1 and 2, while for outside contouring the templet should project directly outward, as in Fig. 3. In order to positively and accurately hold the templet in either of said horizontal positions, I provide a horizontal threaded aperture in the collar 8, into which is threaded the headless screw 16, whose inner end terminates in a tongue 16′, shown in Fig. 12, which tongue is adapted to fit in either of the channels, 9′ or 9″. When properly adjusted, the screw 16, may be rigidly secured by tightening the lock-nut 16″ thereon, at which time said tongue will be located on one of said channels, 9′ or 9″. All of said parts are stationary, with relation to the base frame E of the lathe herein shown, except as to their adjustments.

Secured to the head H is the standard 17, to which is adjustably attached the horizontal arm 18, by means of the screw 19. The left-hand end portion of the arm 18 enters the clamp 20, where it is adjustably secured by the thumb screw 21. Extending directly downward from the clamp 20 is the connecting-rod 22, its lower end portion being secured to the clamp member 23. Numeral 24 denotes the vertical suspension rod, which is adjustably secured to the members 23, by the thumb-nut 25. Secured to and suspended from the lower end of the rod 24 is the angular bracket 26, which carries the pressure indicator 27. Extending outwardly and downwardly from the bottom of the indicator 27, is the pressure stem 28, whose forward and downwardly extending portion is adapted to slide against the outline configuration of the templet 14. Said stem 28 is adapted to move forward and backward, being normally pressed outward resiliently by means of a spring, not shown located inside the indicator. The top of the indicator 27 has an upwardly directed graduated dial 29, which is covered by a glass crystal; and operative around over said dial is an indicator hand 30, which travels over the dial whenever the stem 28 is pressed inwardly, and it then returns to normal position when the stem 28 is released. Said indicator is not a part of my invention per se, and I make no claim thereto, except as associated with the other parts herein shown and described.

Figures 3 and 15 relate, more especially, to the contouring of an outside mold, in which numeral 31 denotes an arm which is adapted to take the place of the standard 17. The arm 31 is also to be secured to the head H, but it projects directly forward outward horizontally therefrom, and it also is adapted to carry the right-hand end portion of the arm 18 which is adjustably and detachably secured thereto, substantially as shown in Fig. 3.

Numeral 32 designates a mold form which has been contoured upon its periphery by assistance of my invention in connection therewith.

Numeral 33 denotes the templet for obtaining the contour shown in Fig. 15. Otherwise than that just stated, the lathe and the various parts of my construction are the same as that described for inside contouring.

In changing my device from inside to outside contouring, one has only to replace the standard 17 with the longer arm 31; giving the templet-bar a half-turn, in an axial direction; and replacing the templet 14 for the templet 33. In order to turn the templet-bar 12 one has only to remove the nut 10, which will permit the templet-bar 12 to be moved endwise directly to the right until the stem 9 is removed from the collar 8, then after giving the bar 12 a half-turn then the stem 9 is to be reinserted in the aperture 8', of the collar 8, causing the tongue 16' to be located in the other one of the channels 9' or 9'', as the case may be, then after replacing the nut 10, and contacting it with the collar 8, the device will be arranged for outside work, as shown in Fig. 3.

The operation of my invention is simple, and it will probably have been anticipated from the description herein before set forth.

However, assuming that the operator is familiar with the operation of the lathe, we will proceed with the operation of my invention.

The mold under consideration at this time is formed in two sections, A and B, which are secured together by the band R, as above set forth, with the starting aperture formed therein and with the mold centered and secured to the lathe substantially as shown.

The bit D may now be moved to the left or right, by the operation of the wheel O, or forward and backward by the handles M and N, as required for cutting out the interior of the casting, which operations are accomplished by the usual manipulation of the lathe.

In the utilization of my invention one should first determine the position the hand 30 of the indicator will be in when the bit is at the proper point to form the matrix to the proper shape and size, then by simply causing the bit to cut away all the material inside the mold to the same degree as that denoted by the indicator hand, he will then be sure that the contour of the matrix will correspond exactly with the contour of the templet, therefore one may depend that the matrix will be absolutely correct without even removing the bit from the mold or hesitating in the operation.

In cutting out the interior of the casting, to form a matrix, it is to be understood that as soon as the bit arrives at any point which is in the limit of the contour of the proposed matrix, the same will be indicated by a slight movement of the hand 30 on the dial 29 of the indicator, and this notifies the operator that the templet has then been engaged, at one point at least, by the compression stem 28. As soon as this point is determined then the operator has only to manipulate the lathe such that the same point will be indicated by the hand 30 throughout the extent of the lateral movements of the bit D inside the mold, and when this extent is attained it will be certain that the profile of the matrix thus formed will accurately correspond with the contour of the templet.

Stated in another way, perhaps more clearly: The operator should first cause the compression stem 28 to contact with the irregular contour of the templet 14, or the templet 33, whereby a certain selected degree of pressure is indicated by the hand 30 of the pressure indicator 27, then while causing the bit to cut away the material of the casting he should, by the manipulation of the bit, cause the hand to indicate, approximately, the same degree throughout the movements of the bit from end to end longitudinally of the matrix being formed, which when attained will insure that the contour of the matrix, or other form, corresponds with the contour of the templet which is employed at that time.

For the purpose of forming a peripheral contour, such as that shown in Fig. 15 for instance, the same operation is required as for inside contouring, but of course the device must be given a slight rearrangement, that is locating the parts as shown in Fig. 3, and with the casting block, from which the form 32, or its equivalent, is to be made, properly centered and secured to the head stock; substituting the standard 17 for the arm 31; turning the templet-bar half-way over; and substituting the temple 14 for the templet 33, then the operation of contouring the form 32 may be proceeded with as above stated, insuring absolute accuracy with relation to the templet.

While it is contemplated that my invention will be employed more especially in contouring molds for metal castings and for molds for forming glassware, it is not to be limited thereto, as there are other uses to which my invention may be employed.

I desire that it be understood that various changes may be made in the several details, herein set forth, without departing from the spirit of my invention, or sacrificing any of the advantages thereof which are new and useful and which involve invention.

Having now fully shown and described my invention, what I claim, and desire to secure by Letters Patent of the United States, is—

1. In combination with a lathe having a bed-plate, a face plate adapted to be rotated by the lathe, and a bit carried by the carriage of the lathe and adapted to be manipulated inside a blank casting carried by the face-plate; a templet adjustably attached to the bed-plate and providing the profile to be formed by the bit inside said casting, and an indicator movable with the bit and having a graduated dial with a hand adapted to rotate, by pressure, over said dial, a stem for operating said hand with said stem projecting from said indicator, whereby the operator, by keeping said stem at a certain pressure against the templet causing the hand to remain stationary with relation to the dial, will cause the bit, when manipulated, to cause the matrix to be of the same profile as that of the templet.

2. In combination with a lathe having a stationary body, with a face plate adapted to be rotated by power and having means for holding a casting in connection therewith, and a bit adapted to be manually operated to cut out material from the interior of the casting; a templet connected with the body of the lathe, a spring pressure stem adapted to follow the contour of the templet, and a relatively stationary indicator including a dial with a hand adapted to travel over the dial and operated by said stem as it follows said contour whereby the operator may control the movements of the bit in order to form the longitudinal curvature of the matrix as it is being formed by the bit.

3. In combination with a lathe, means for enabling an operator of a lathe to accurately profile a matrix inside said mold as the matrix is being formed, said means comprising a templet, a spring actuated stem adapted to travel on the contour of the templet, an indicator actuated by said stem in order to designate thereby when the profile of the matrix is the same as the profile of the templet.

4. In combination with a lathe, means for enabling an operator to properly profile a matrix as it is being formed inside a casting, comprising a relatively stationary templet, a stem adapted to travel on and follow the contour of the templet in order to actuate means to designate to the operator when the profile of the matrix being formed is the same as the profile of the templet, and an indicator connected with said stem for enabling the operator to cause the contour of the matrix to be the same as the contour of the templet then employed.

5. In combination with a lathe, means for profiling the matrix for a mold or the like by means of a tool in connection with the lathe, including a relatively stationary templet having the profile to be formed; an indicator carried laterally with said tool for forming the matrix, a stem connected with said indicator and adapted to resiliently contact with the profile of the templet as the tool forming the matrix moves laterally whereby the operator of the lathe may, by observing the dial, control the tool in order that the matrix will conform with the contour of the templet which is then being used with the device.

6. In combination with a lathe adapted to rotate a casting and having a tool for cutting said casting as the tool is manipulated in order to form a matrix in the casting; and a stationary templet having the profile of the matrix to be formed; a spring pressure indicator carried concurrently with said tool, a stem connected with said indicator and adapted to contact resiliently with the profile of the templet, whereby the operator may by manipulating said tool, and whereby the hand of the indicator will be retained at a predetermined degree, cause the matrix to have the same profile as the templet.

7. A device of the nature set forth, comprising a relatively stationary templet, means for securing the templet in horizontal position, a pressure-gage adapted to move laterally in conjunction with the lateral movements of a cutting tool for forming a certain contour in connection with a mold, a stem carried by said gage and adapted to operate the mechanism thereof for causing the gage to display various degrees of pressure with relation to the templet, said stem being adapted to follow the contour of the templet, and means whereby the indicated pressure shown by the gage as it is operated by contact of the stem with said templet will be a guide to the operator whereby he may control a tool in such manner that the contour of the finished mold will be the same as the contour of the templet.

CARLISS E. FLATTER.